Nov. 12, 1968         C. F. POTTS         3,410,196

DISPOSABLE COFFEE BASKET LINER

Filed May 16, 1967

INVENTOR
CELIA F. POTTS
BY
*Elliott & Pastoriza*
ATTORNEYS

United States Patent Office 3,410,196
Patented Nov. 12, 1968

3,410,196
DISPOSABLE COFFEE BASKET LINER
Celia F. Potts, 4284 Encino Lane,
Ventura, Calif. 93001
Filed May 16, 1967, Ser. No. 638,874
2 Claims. (Cl. 99—295)

ABSTRACT OF THE DISCLOSURE

This disclosure relates to a liner for conventional coffee baskets made of thin aluminum material in a cylindrical shape such that it may readily be received in the cylindrical coffee basket to line the walls thereof. The central portion of the liner includes an upwardly extending tubular portion for receiving the coffee basket stem and thus lining the stem. The walls of the liner are corrugated and the floor portion of the liner includes a plurality of small openings. In order that water may properly pass through grounds disposed in the liner through the small openings and out through the bottom of the basket, the floor portion of the liner includes bent down small tabs which engage the bottom of the basket and hold the floor portion of the liner in spaced relationship thereto.

---

Figure 1:
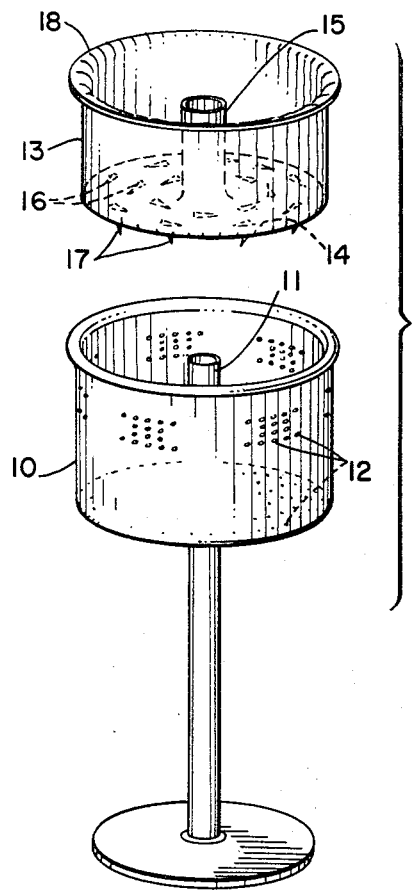

This invention relates to disposable coffee basket liners and more particularly, to an improved liner for use with home coffee percolators employing conventional baskets and stems.

Many different types of disposable packages for use in conventional coffee baskets to avoid the annoying problem of having to get rid of the coffee grounds after coffee has been made have been proposed heretofore. Generally, these prior art structures take the form of closed packages containing a measured amount of coffee which may simply be placed in the basket.

In other instances, there have been provided disposable filters which may be adapted to conventional coffee baskets but these structures are generally difficult to insert and remove, the filtering action tending to cause the same to adhere to the side walls of the basket.

In still other instances, there have been proposed disposable structures which serve as a complete replacement for the basket. However, to provide the required strength in making a pot of coffee necessitates a design which is relatively expensive and thus not feasible economically if the same is to be disposable.

There has not been provided, so far as I am aware, a simple coffee basket liner which can be easily inserted in a conventional coffee basket for supporting the coffee grounds, and after coffee is made, readily disposed of. One of the problems in providing such a liner is the necessity of having the same porous as by providing openings therein. However, if such openings should not register with the bottom openings of the basket, the water cannot properly percolate through the liner and basket. If a completely porous material is employed which more or less functions as a filter, the heretofore referred to problems of difficulty of the material sticking to the sides of the coffee basket and the bottom, particularly when boiling water is perked therethrough, results.

Bearing all of the foregoing considerations in mind, it is accordingly a primary object of the present invention to provide a greatly improved disposable type coffee basket liner wherein it is a very simple matter to insert the same and remove the same after use to enable disposal of the grounds in a neat and efficient manner.

Another important object is to provide a coffee basket liner which is economical to manufacture and use as compared to proposed prior art structures.

Briefly, these and other objects and advantages of this invention are attained by providing a coffee liner having a cylindrically shaped wall of thin pliable material, preferably thin aluminum foil, merging into a floor portion closing one end of the cylindrical shape. The central portion of the floor portion includes an upwardly extending structure defining a cylindrical tubular shape in coaxial relationship to the cylindrically shaped wall such that the liner is receivable in a coffee basket supported on a stem, the inner walls of the coffee basket being lined by the cylindrically shaped wall and the portion of the stem extending centrally within the basket being lined by the cylindrical tubular shape.

Preferably, the wall portions of the liner are corrugated such that the upper end of the liner may be radially flared outwardly to overlie the upper lip or peripheral edge of the basket itself.

In accord with a unique feature of the liner, the floor portion includes a plurality of openings together with downwardly extending bent tabs formed of the aluminum material of the liner arranged to engage the bottom of the basket and thus hold the floor portion of the liner in spaced parallel relationship to the bottom of the basket. This arrangement permits water to trickle through the liner into the space between the floor of the liner and the bottom of the basket for ultimate passage through the basket itself so that there is no concern as to whether or not the holes in the liner register exactly with the holes in the basket.

Figure 2:
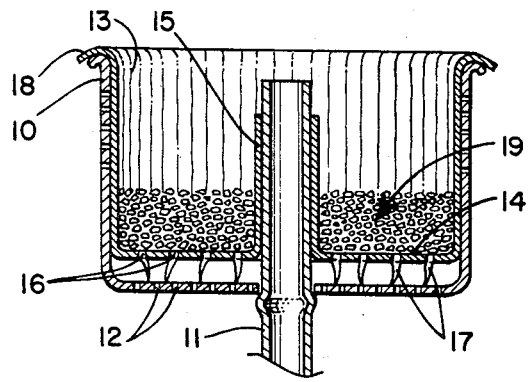

A better understanding of the invention will be had by now referring to one embodiment thereof as illustrated in the accompanying drawings, in which:

FIGURE 1 is an exploded perspective view of a conventional coffee basket and stem preparatory to receiving a liner designed in accord with the present invention; and, FIGURE 2 is a fragmentary cross section of the liner in position within the coffee basket of FIGURE 1.

Referring first to FIGURE 1, there is shown a conventional coffee basket 10 supported on the usual stem 11 and provided in its bottom with a plurality of strainer type holes 12.

In accord with the present invention, a liner is provided for the coffee basket shown disposed above the basket itself. This liner is preferably formed of a pliable material such as thin aluminum foil and comprises a cylindrically shaped wall 13 merging into a floor portion 14. As shown, the central part of the floor portion includes an upwardly extending portion 15 in the form of a generally cylindrical tube. This tube is coaxially positioned within the cylindrically shaped wall 13 of the liner. The floor portion between the central tubular structure 15 and the inner walls includes a plurality of openings 16. Also provided on the underside of the floor portion are a plurality of small tabs 17 made of the same material as the liner and bent downwardly as indicated.

The liner itself has its side wall 13 corrugated such that the upper portion of the liner may be radially flared outwardly as indicated at 18.

With the foregoing design for the liner, it may be simply inserted within the basket 10, the central portion of the stem 11 extending within the basket being received in the tubular portion 15 of the liner. The resulting arrangement is illustrated in the fragmentary cross section of FIGURE 2.

With particular reference to FIGURE 2, it will be noted that the small downwardly bent tabs 17 of aluminum foil engage the bottom of the basket 10 and thus hold the floor 14 of the liner in substantially spaced parallel relationship to the bottom of the basket. There is thus provided a space into which water may pass when percolating through the opening 16 of the liner to the bottom of the basket. The water is thus capable of easily passing through the conventional basket bottom openings 12.

It will also be noted in FIGURE 2 that the upper flared flange portion of the liner 18 is designed such that it can overlie the upper peripheral edge of the basket 10 itself and thus provide further support for the liner within the basket.

In operation, the liner is inserted into the basket with the tubular stem 11 received within the tubular portion 15 as described. Coffee such as indicated at 19 in FIGURE 2 is then placed in the liner in the same manner that the same would be placed in the basket 10. The central tubular portion of the liner as indicated at 15 extends beyond the level of coffee grounds inserted in the liner and thus there is complete isolation of the coffee grounds from any portion of the basket or stem itself. The aluminum foil is sufficiently thin that a conventional basket top may be inserted over the basket if desired.

The coffee is then perked in a percolator in the usual manner and after the coffee is made, the liner 13 may readily be removed by simply pulling on the overlying flange portion 18 such that the entire liner together with the grounds slides easily from the stem and interior portion of the basket.

The grounds can thus be disposed of along with the liner and the basket itself is left in a neat and clean condition insofar as grounds themselves are concerned.

Since the liner constitutes a single integral sheet of material which is corrugated to accommodate the shaping of the liner as described in FIGURE 1, it may be very economically produced. The use of aluminum foil itself avoids the problems of any sticking of the liner material to the side walls of the basket.

From the foregoing description, it will thus be evident that the present invention has provided a greatly improved disposable liner for use with coffee percolators wherein all of the various objects set forth are fully realized.

What is claimed is:

1. A coffee basket liner comprising: a cylindrically shaped wall of thin pliable material merging into a floor portion closing one end of the cylindrical shape, the central portion of said floor prtion extending upwardly in a cylindrical tubular shape in coaxial relationship to said cylindrically shaped wall such that said liner is receivable in a coffee basket supported on a stem, the inner walls of said coffee basket being lined by said cylindrically shaped wall and the portion of said stem extending centrally within said basket being lined by said cylindrical tubular shape, said floor portion of said liner including a plurality of small openings and having small tab means constituting said liner material bent downwardly to engage the bottom of said coffee basket and thereby support said floor portion in substantially spaced parallel relationship to the bottom of said basket whereby water can percolate through coffee grounds received in said liner and through said plurality of small openings to the space defined between said floor portion and the bottom of said basket and thence through said basket.

2. A liner according to claim 1, in which said liner material is thin aluminum foil, said cylindrically shaped wall being corrugated, the upper peripheral end of said wall flaring radially outwardly to define a flange portion adapted to overlie the upper annular peripheral edge of said basket.

References Cited
UNITED STATES PATENTS

| 2,546,874 | 3/1951 | Siegrist | 99—77.1 |
| 3,119,694 | 1/1964 | Gauld | 99—295 X |
| 3,225,680 | 12/1965 | Cirrincione | 99—312 |

ROBERT W. JENKINS, *Primary Examiner.*